United States Patent
Cameron

[15] 3,679,219
[45] July 25, 1972

[54] HYDRAULICALLY ACTUATED CHUCK

[72] Inventor: Gordon N. Cameron, 1322 Hampton Road, Grosse Pointe Woods, Mich. 48236

[22] Filed: Feb. 20, 1970

[21] Appl. No.: 13,107

[52] U.S. Cl. .................................279/1 Q, 279/2, 279/4
[51] Int. Cl. ....................................................B23b 31/30
[58] Field of Search.................279/1 Q, 1 D, 4, 96, 102, 2

[56] References Cited

UNITED STATES PATENTS

| | | | |
|---|---|---|---|
| 3,202,432 | 8/1965 | Cameron | 279/4 |
| 2,826,420 | 3/1958 | Klingler | 279/1 Q |
| 3,130,978 | 4/1964 | Van Roojen | 279/4 |

FOREIGN PATENTS OR APPLICATIONS

| | | | |
|---|---|---|---|
| 943,872 | 6/1956 | Germany | 279/1 Q |

Primary Examiner—Andrew R. Juhasz
Assistant Examiner—James F. Coan
Attorney—Farley, Forster and Farley

[57] ABSTRACT

A sleeve actuated hydraulic chuck for accurately locating internal work pieces or tool elements for machining, grinding, gauging or other operations. The chuck is substantially symmetric for vibrationless operation at high speeds.

8 Claims, 4 Drawing Figures

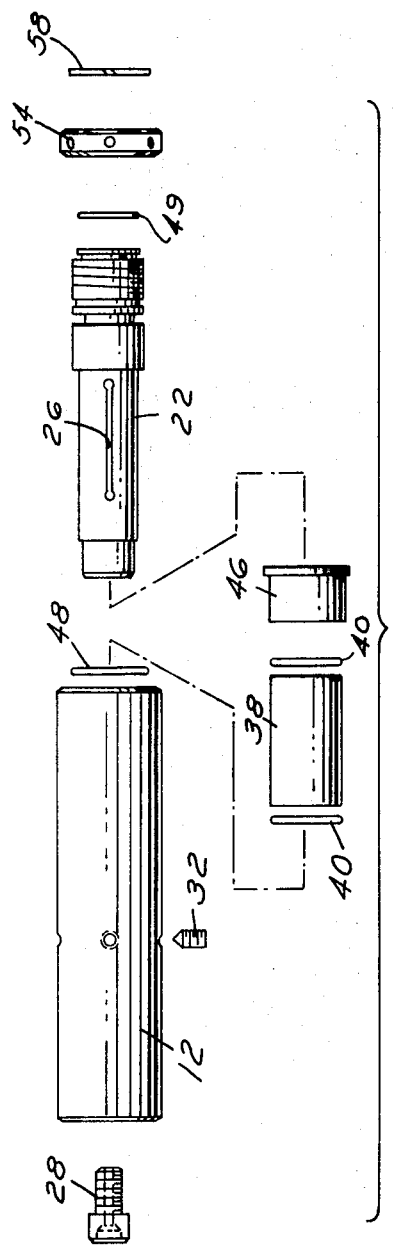
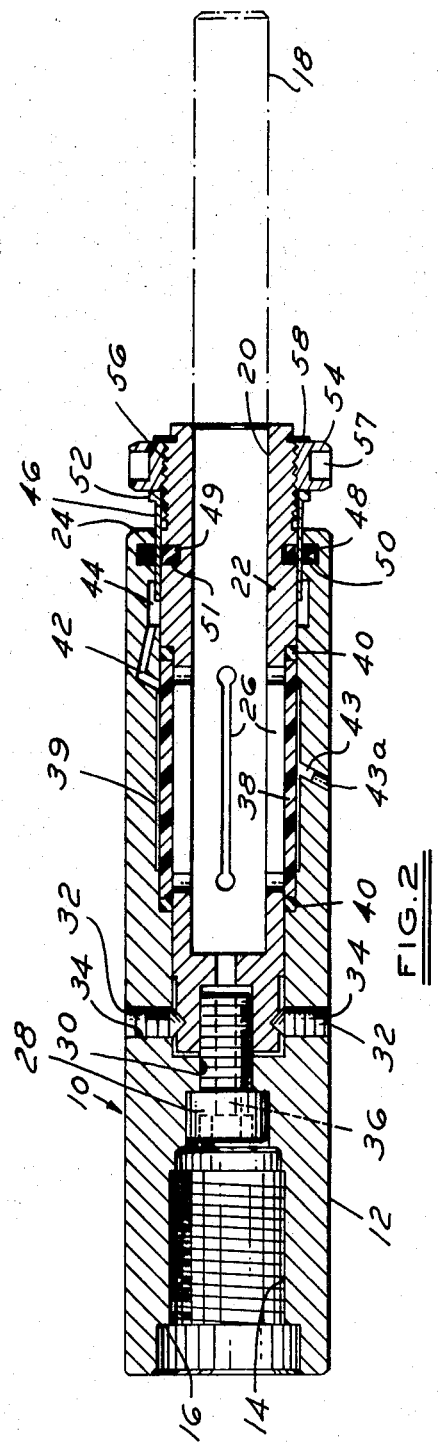

HYDRAULICALLY ACTUATED CHUCK

BACKGROUND OF THE INVENTION

The invention pertains to the field of tool holding chucks for use on a variety of metal working machines such as drills, grinders and lathes. A variety of mechanically and hydraulically operated chucks have been in use for many years. Two criteria however have always been very important. Since production time is dependent upon down time, the time required to remove and replace a tool holder is critical. Production is also dependent upon the permissable speed of rotation of the tool. For the higher speeds, it is important that tool speed is not limited by the unbalance present in the chuck. Unbalance will always be present where the chuck is not completely symmetrical in configuration. An example of the prior art is my hydraulically actuated chuck construction shown in U.S. Pat. No. 3,202,432. It is readily apparent that the actuating means is asymmetric and therefore can contribute to unbalance at high rotative speeds.

SUMMARY OF THE INVENTION

The present invention comprises a chuck which holds a tool element internally. An internal cylinder is contractable about the tool element and is actuated by hydraulic fluid in passages extending around the outer circumference of the cylinder. The hydraulic fluid is put under pressure by a sleeve and nut assembly, also symmetric about the tool element. The body of the chuck is symmetric about the tool element also. In summary, all portions of the chuck assembly are symmetric about the center line of the tool element. The chuck is therefore suitable for very high speed operation and has been utilized up to 30,000 rpm.

DESCRIPTION OF THE DRAWINGS

FIG. 1 is an exploded view of the chuck;
FIG. 2 is a cross sectional view of the chuck as assembled.

DESCRIPTION OF THE PREFERRED EMBODIMENT

Figure 3:
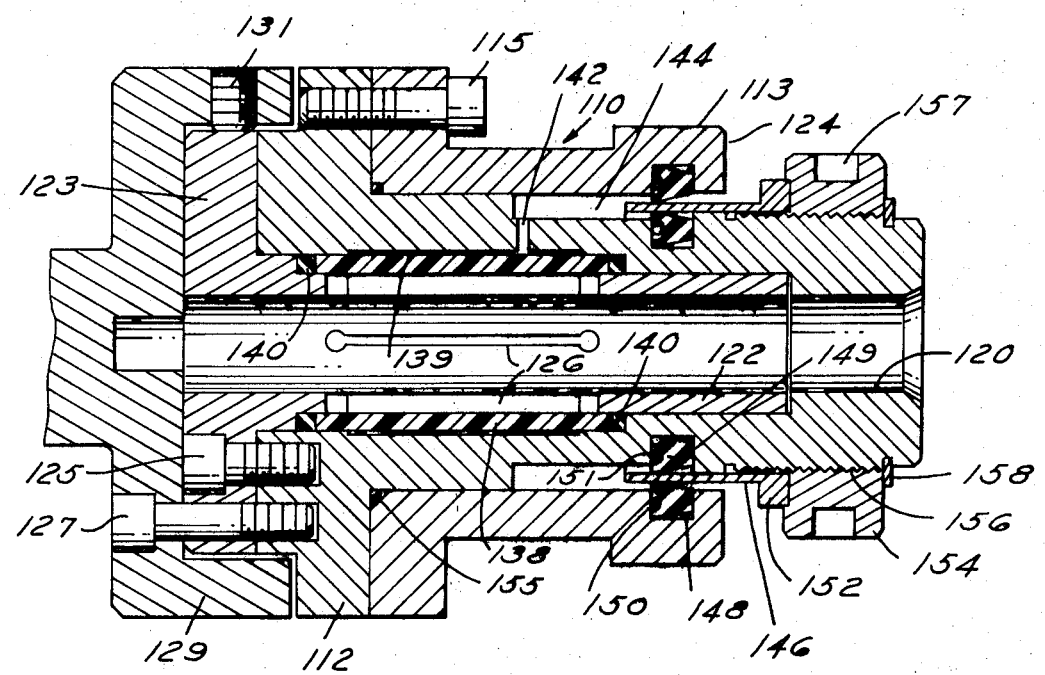
FIG. 3 is a cross-section of a modification of the chuck.

In FIGS. 1 and 2, the chuck generally denoted by 10 comprises a relatively thick walled cylindrical body 12 within which is contained a threaded bore hole 14 and shoulder 16. The bore hole 14, and the shoulder 16 are provided for driving attachment of the chuck. At the other end of the chuck 10 a tool element shown in outline 18 fits into a bore hole 20 located inside a cylindrical slotted shell 22 which in turn extends out beyond the end 24 of the body 12. Four slots 26 are located symmetrically in the shell 22 to provide compressive flexibility. The shell 22 is held longitudinally within the body 12 by a cap screw 28 threaded within a shoulder bore hole 30. To ensure driving engagement, the shell 22 is also held against rotation by four symmetrically located set screws 32 threaded into holes 34. A coolant passage 36 is drilled through the cap screw 28 and shell 22. A sleeve 38 preferably of a strong flexible plastic such as nylon surrounds the shell 22 completely covering the slots 26. At either end of the sleeve 38 are located O-ring sleeve seals 40. Surrounding the sleeve 38 is a clearance space 39 in the order of 0.002 of an inch thickness. This clearance is likewise sealed at either end by the O-ring sleeve seals 40. The clearance space communicates through a passage 42 with the hydraulic reservoir 44. In manufacturing the body 12, the passage 42 is drilled through from hole 43 which may be used for initial hydraulic filling and is then permanently plugged at 43. The hydraulic piston comprises a cylindrical sleeve 46 which surrounds the shell 22 and extends into the reservoir 44. The piston sleeve 46 is sealed on either side by reinforced cup seals 48 and 49 with O-rings 50 and 51 to preload. The piston sleeve 46 has a flange 52 which abuts a nut 54 in threaded engagement 56 with the shell 22. Socket holes 57 are symetrically located about the nut 54 for tightening purposes. A snap ring 58 provides an outer limit for the nut 54.

In FIG. 3 a modification adapted for a different driving engagement is shown. The operation is identical with the basic embodiment however the assembly of parts is significantly different. The chuck generally 110 comprises two telescoped symmetric inner and outer body parts 112 and 113 bolted together by symmetrically located bolts 115. The shell 122 has a flange 123 symmetrically bolted 125 to the inner body part 112. The entire chuck is drivingly bolted by symmetrically arranged bolts 127 to a rotating drive flange 129. Three symmetrically arranged set screws 131 are provided to adjust concentricity of the chuck with respect to the flange 129 prior to final tightening of the bolts 127. As before a flexible sleeve 138 surrounds the shell 122 about the slots 126 and is sealed at both ends by O-rings 140. The piston 146 extends into the reservoir 144 which in turn communicates through a passage 142 to the clearance volume 139 about the sleeve 138. Inner and outer cup seals 148 and 149 having O-ring preloads 150 and 151 are provided as before. A corner O-ring 155 seals the other side of the reservoir 144. On this embodiment the inner body part 112 extends beyond the end 124 of the outer body part 113 for threaded engagement 156 of the nut 154 which in turn abuts the piston flange 152. As before a snap ring 158 and socket holes 157 are provided. The bore hole 120 for a tool element extends through the inner body part 112.

Figure 4:
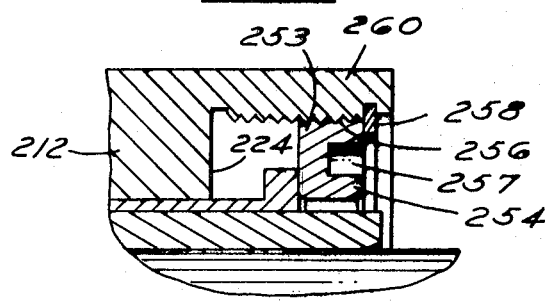
FIG. 4 is a partial cross section of a second modification of the chuck.

In the second modification shown in FIG. 4 the nut 254 is externally threaded 256 within an extension 260 of the body 212 beyond the end 224. A snap-ring 258 is also shown and holes 257 may be provided in the nut 254 for a spanner wrench. The modification of FIG. 4 may be readily adapted to the embodiments of FIGS. 2 or 3.

In each of the embodiments, a small twist of the nut 54 is all that is necessary to lock and unlock the chuck since accurate tolerances are utilized in manufacture of the tool element 18 and bore hole 20 of the shell 22. The small movement of the piston 46 exerts sufficient force on the fluid in the reservoir 44 to hydraulically deflect the slotted portion of the shell 22 into tight engagement with the tool element 18.

I claim:

1. A chuck comprising a rigid body, a bore hole extending axially inwardly from one end of said body, a deflectable slotted shell axially fixed in said bore hole having slots extending for a limited portion of length adapting said portion for radially inward deflection, rigid portions of said shell extending beyond said slots at either extremity thereof, each of said rigid portions being radially supported by said rigid body, a sleeve constructed of relatively more flexible material covering the slotted portions of said shell, means defining a sealed fluid chamber communicating with the outside of said sleeve, and, means for establishing hydraulic pressure in said chamber for actuating said sleeve and shell to a holding position, said last means including piston means concentric with said bore hole.

2. A chuck according to claim 1 wherein said shell extends outwardly beyond the end of said body, and said actuating means being located on said shell.

3. A chuck according to claim 2 wherein said actuating means includes a rotatable threaded member engaging a flange on said piston means.

4. A chuck according to claim 1 wherein said hydraulic pressure means includes a fluid reservoir concentric with said bore hole, communicating with said fluid chamber and said piston means extends into said reservoir.

5. A chuck according to claim 1 said actuating means being mounted on said body and engaging said piston means.

6. A chuck according to claim 5 said actuating means including a rotatable threaded member engaging a flange on said piston means.

7. A chuck according to claim 1 including means is said body engaging said shell to transmit torque to said shell.

8. A chuck according to claim 1 wherein substantially all elements of said chuck are symmetric with respect to said bore hole for balanced operation at relatively high rotative speeds.

* * * * *